INVENTOR
Christie C. Prevost

Nov. 20, 1962  C. C. PREVOST  3,065,467
CHECK RECEIPTING AND DEPOSITORY APPARATUS
Filed Oct. 31, 1958  4 Sheets-Sheet 3

INVENTOR
*Christie C. Prevost*

BY *Burns, Doane, Benedict & Irons*
ATTORNEYS

Nov. 20, 1962

C. C. PREVOST 3,065,467

CHECK RECEIPTING AND DEPOSITORY APPARATUS

Filed Oct. 31, 1958

INVENTOR
*Christie C. Prevost*

BY
*Burns, Doane, Benedict & Irons*
ATTORNEYS

United States Patent Office 3,065,467
Patented Nov. 20, 1962

3,065,467
CHECK RECEIPTING AND DEPOSITORY
APPARATUS
Christie C. Prevost, 10 Brookside Way,
Greenville, S.C.
Filed Oct. 31, 1958, Ser. No. 771,008
4 Claims. (Cl. 346—22)

This invention relates to apparatus for receiving and storing checks and making and dispatching copies of the checks.

In normal banking operations, when a customer deposits a check, he receives from the teller a receipt recording the fact that the check was deposited. The receipt generally indicates the amount of the check, identifies the depositor, and contains certain other information such as the date on which the check was deposited. There are circumstances, however, where it is desirable to receive checks for deposit where a teller is not available to issue a receipt. For example, banks customarily have night depositories at their regular places of business. Further, it is frequently desirable to have depositories at factories and other business establishments to enable employees to deposit their pay checks without having to visit the bank. The maintenance of tellers to receive deposits and issue receipts at the bank at night and at other business establishments during normal business hours is not practicable. Moreover, the use of mechanical depositories having no facilities for making and issuing receipts having complete information thereon is disadvantageous because they afford inadequate records for the bank and discourage use of such depositories by depositors.

Accordingly, a primary object of this invention is to provide an improved check depository which automatically makes and issues a receipt copy of each check received.

A further object of the invention is to provide an improved check depository which, for each check received, automatically makes a storage copy for retention by the bank and a receipt copy for return to the depositor.

Another object of the invention is to provide an improved check depository which automatically makes and dispatches record copies of the checks with other identifying indicia marked on such copies.

Still another object of the invention is to provide an improved check depository embodying a new and advantageous combination of structural elements for quickly and efficiently making and dispatching record copies of the checks received.

The invention broadly includes an apparatus for storing and receipting for checks which comprises housing means having an inlet for checks and an outlet for receipt copies of the checks, and a copying assembly within said housing means for making the receipt copies of the checks on web material sensitive to said copying, said housing having a storage compartment to receive checks from said copying assembly, said receipt copies being fed from said copying assembly to said outlet.

The invention having been generally set forth, a preferred specific embodiment for the accomplishment of the stated objects and others will now be described in detail with reference to the drawings, in which.

Figure 1:
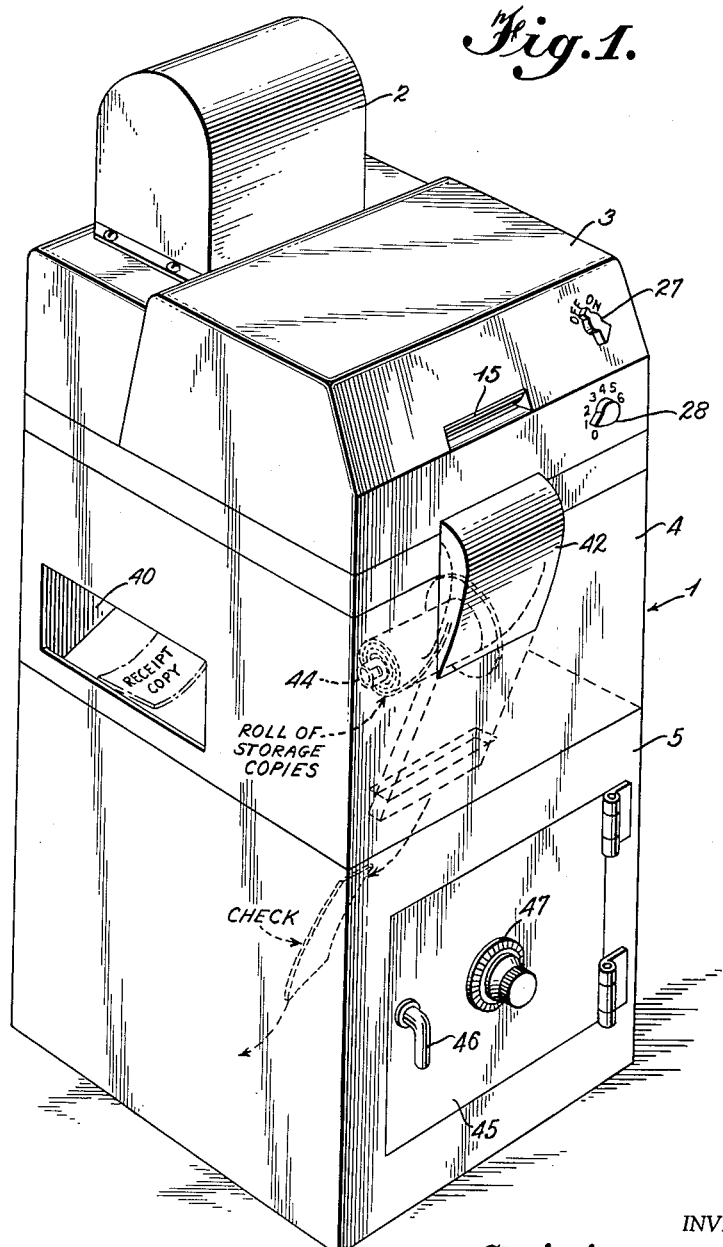
FIGURE 1 is an isometric view of an apparatus according to the invention.
Figure 2:
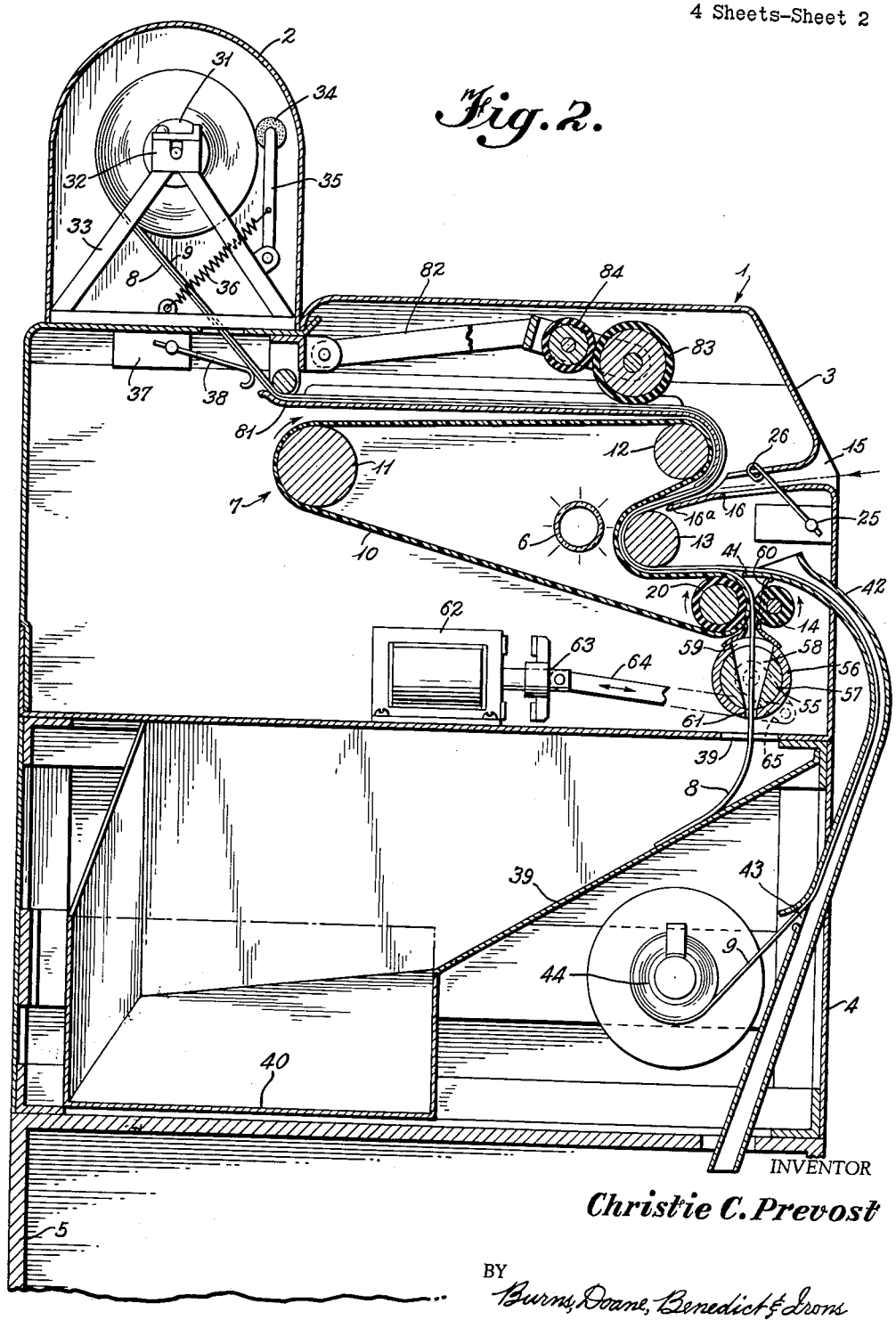
FIGURE 2 is a side elevation in section and partially broken away.

As depicted in FIGURE 1, the inner components of the apparatus of the invention are encased in a multiple compartment housing 1. The uppermost compartment 2 contains a paper-supply reel. The next lower compartment 3 comprises a conventional copying machine. The next lower compartment 4 contains paper-guiding chutes, a storage reel, and a portion of the control mechanism for the apparatus. The lowermost compartment 5 comprises a conventional storage safe. Preferably, the outer walls of the housing are constructed of metal sufficiently strong to minimize the danger of thievery or other tampering. Such walls may be unitary or formed in sections connected together by appropriate means such as welding or bolting. The various compartments and the apparatus components which they house will be described in more detail hereinafter. The multiple compartment construction is preferred to facilitate assembly and to permit the use of a conventional copying machine and safe. It will be understood, however, that a single compartment housing or one having fewer or more compartments than shown in the drawings may be utilized.

Preferably, the copying machine of compartment 3 comprises a thermoprinting assembly capable of making multiple copies of checks on separate strips of copying paper. The copying machine shown more or less schematically in the drawings comprises a conventional thermoprinting machine with certain modifications to adapt it to the invention. The principles of operation of the thermoprinting copying machine are fully described in United States Patents 2,740,895 and 2,740,896, issued April 3, 1956, to Carl S. Miller.

The copying means of the thermoprinting assembly comprises a lamp 6 which is a source of radiation high in infrared. The lamp is mounted in the machine by any suitable means, not shown. The thermoprinting assembly is also provided with a web-feeding device 7 which moves a pair of strips of copying paper 8 and 9 past the copying lamp 6 by means of a transparent belt 10 which is driven in an endless path by a rubber-covered drive roller 20 and a plurality of guiding rollers 11, 12 and 13. The belt 10 is made of a heat-resistant, flexible, and transparent material. Opposing the drive roller 20 is a sponge rubber-covered roller 14. All of the rollers are suitably journaled in the housing frame.

An inlet 15 is provided in the housing through which checks may be inserted. The checks are guided by a passageway 16 into the nip between the roller 13 and the paper strips 8 and 9 which are retained against the roller 13 by the transparent belt 10. The passageway 16 has an elongated lip 16a extending very close to such nip. Thus, the paper strips 8 and 9 and the check are held in a tight three-ply combination for movement in close proximity to the copying lamp 6 to effect the copying operation.

As fully described in the previously mentioned Miller patents, the characteristics of the copying paper, the check paper, and the marking material on the checks is such as to produce a readable copy of such marking material on the strips 8 and 9 when the three-ply combination is exposed to radiation from the lamp 6. The paper strips 8 and 9 are treated with a heat-sensitive composition capable of undergoing irreversible visible change when momentarily heated to a predetermined temperature. The checks are imprinted with ink or other marking means which is absorbent with respect to the particular radiation emanating from the lamp. Carbon inks are preferred. Various types of radiation, inks, and copying paper composition may be employed to achieve the desired effect. It will be understood that other types of copying apparatus may be employed instead of a thermo-printing device. Various photographic or other copying processes could be employed.

Figure 3:
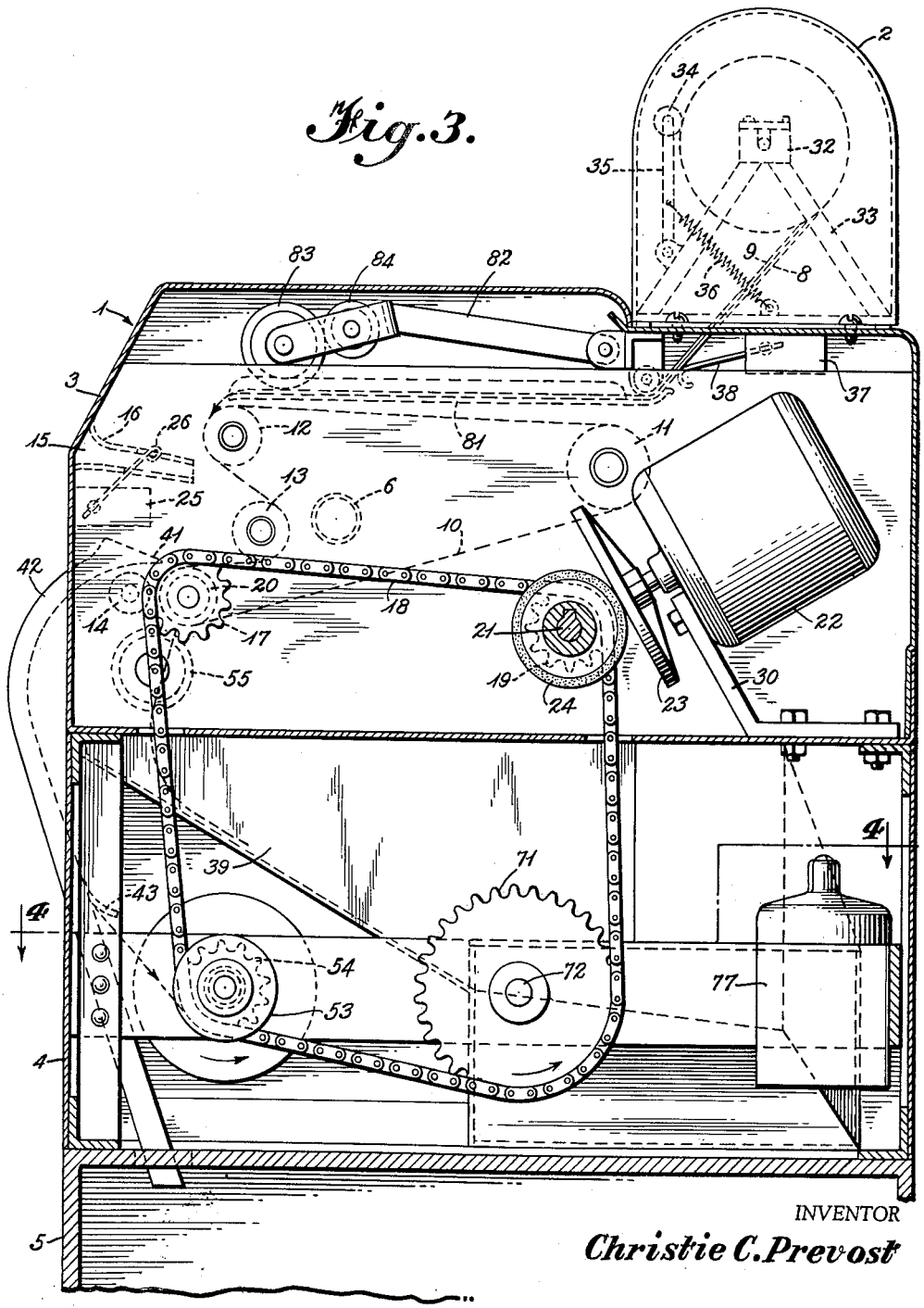
FIGURE 3 is a side elevation in section and partially broken away taken in the opposite direction from FIGURE 2.
Figure 4:
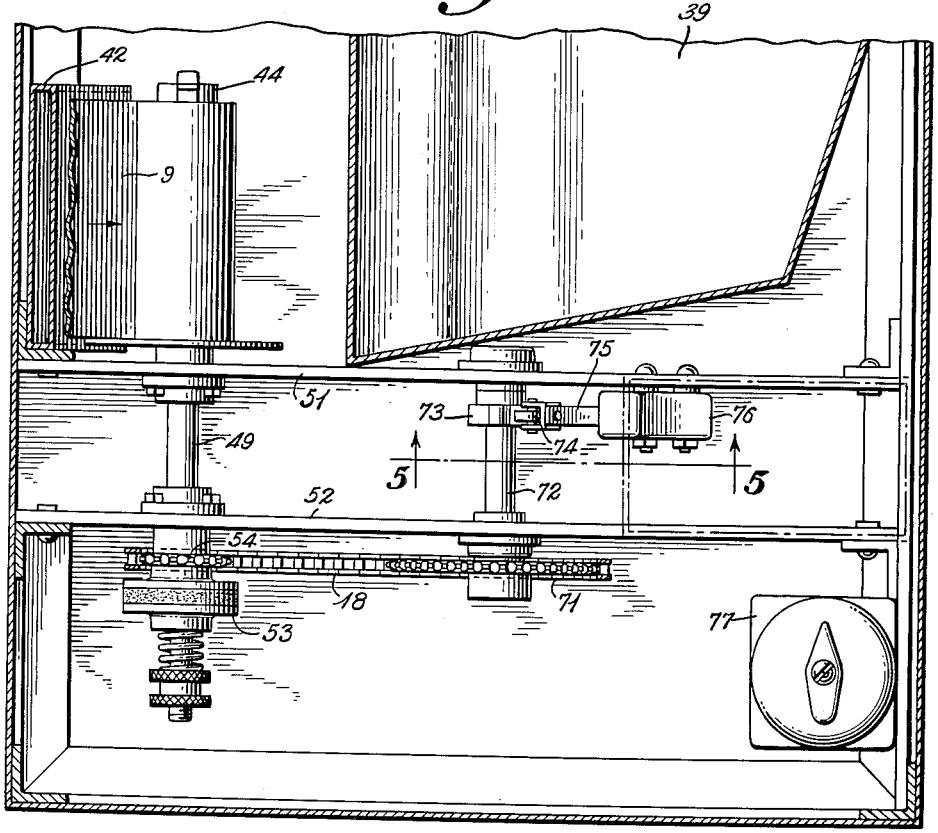
FIGURE 4 is a fragmentary sectional plan view taken along the line 4—4 of FIGURE 3.
Figure 5:
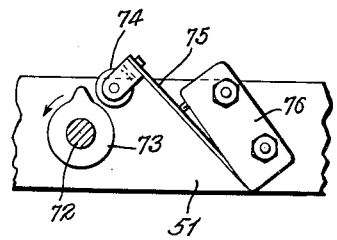
FIGURE 5 is a fragmentary vertical sectional view taken along the line 5—5 of FIGURE 4.

Non-rotatably mounted on one end of drive roller 20 is a sprocket 17 which engages in driving relationship a chain 18 which in turn is driven by a drive sprocket 19 mounted on axle 21 which is driven by an electric motor 22. As shown in FIGURE 3, the motor 22 is mounted on a stand 30 bolted to the housing frame. The motor 22 drives the axle 21 through a suitable speed change mechanism comprising a disc 23 driven by the motor 22 and which in turn drives by frictional radial contact a disc 24 which is slideably but non-rotatably mounted on the axle 21. The drive ratio between the motor 22 and the axle 21 may be varied in the well-known manner by axial adjustment of the disc 24 along the axle 21 to vary the effective drive radius of the disc 23 against the disc 24. The speed change mechanism is controlled by knob 28 on the outside of the housing.

The motor 22 is operated by a suitable source of electricity connected to the motor by appropriate circuitry which includes a microswitch 25 having a contact arm 26 which extends through a slot in the wall of the passageway 16. When a check is inserted through the inlet 15 into the passageway 16, the contact arm 26 is rotated and the micro-switch 25 is actuated to energize the motor 22 and the lamp 6. An appropriate holding circuit maintains the motor and lamp energized until de-energized by means hereinafter described. If desired, a switch 27, positioned outside of the housing 1, may be employed as a master switch which must be closed before the motor and lamp may be energized by the micro-switch 25. Alternatively, a master switch may be located remote from the apparatus shown. The lamp 6 is maintained within a desired temperature range by a thermostatic control, not shown, which is responsive to the temperature of roller 13.

The continuous strips of copying paper 8 and 9 are supplied to the web-feeding device 7 from a supply reel 31 which is journaled in bearings 32 which are mounted on brackets 33. To prevent slack from forming in the paper strips, a tension roller 34 is mounted on a pivotal arm 35 and is urged against the paper on the reel 31 by a tension spring 36. A microswitch 37 is mounted against the upper wall of the housing 1 and has a contact arm 38 which is spring biased against the paper strips between the supply reel 31 and the web-feeding device 7. When the supply of paper is exhausted, the micro-switch 38 is opened to prevent restarting of the motor 22 and the lamp 6, after completion of the current cycle, thus permitting that cycle to be finished but preventing further operation of the apparatus until the paper supply is replenished.

After a check has been moved by the web-feeding device 7 past the copying lamp 6, a receipt copy of the check has been formed on the strip 8 and a storage copy of the check has been formed on the strip 9. The strip 8 is separated from the strip 9 and the check by the lip 41 which extends to a position close to the belt 10 from a guide chute 42 into which the strip 9 with the storage copy imprinted thereon and the check are directed. Strip 9 passes through a portion of the chute 42 and emerges from a slot 43 on the inner side thereof and is wound around a storage reel 44 which applies tension to the strip. The check continues down the chute 42 and is deposited in the safe 5 which is provided with the usual door 45, handle 46, and combination lock 47.

The storage reel 44 is fixed to an anxle 49 which is journaled in suitable bearings in cross members 51 and 52 of the housing frame. The axle 49 is rotated through a conventional spring-biased slip clutch 53 by a sprocket 54 which in turn is driven by the chain 18 which, as previously described, is driven by the motor 22. The purpose of the slip clutch 53 is to permit the storage reel 44 to be driven at a relatively rapid rate of speed when the strip winding thereon is small and at a relatively slow rate when the winding is thick in order to smoothly take up the strip without excessive tension or slack.

The strip 8, upon which receipt copies have been formed, is passed below the lip 41 between the rollers 20 and 14. The roller 14 is driven at a slightly faster surface speed than the roller 20 to impart tension to the strip 8 thereby facilitating the separation of the strips and the feeding of the strip 8 into a cylindrical cutter 55. The friction between the rubber-covered roller 14 and the strip 8 is greater than the friction between the strip 8 and the smooth plastic belt 10. A guide plate 60, which is slotted to receive the roller 14, is mounted between the lip 41 and the cutter 55 to prevent the paper from adhering to the roller 14 and being pulled around the lower side of the roller away from the cutter. The cutter severs the receipt copy which then falls into the entrance of a chute 39 which directs the copy to the outlet 40.

The cutter 55 has a fixed outer sleeve 56 in which a cutting cylinder 57 is concentrically mounted for rotation. Extending radially through the cutting cylinder 57 is a wedge-shaped slot 58 which tapers inwardly from the inlet side of the cutter. The sleeve 56 is provided with an inlet slot 59 approximately equal in width to the wide end of the slot 58 and an exit slot 61 approximately equal in width to the narrow end of the slot 58. When the cylinder 57 is rotated within the sleeve 56, a cutting action occurs between the edge on the cylinder 57 at the narrow end of the slot 58 and the edge on the sleeve 56 at the inner end of the slot 61 to sever the strip 8. Preferably, the cutting edges are serrated. Since the slot 59 is wider than the slot 61, no cutting action occurs at the upper end of the cutter, thus leaving the terminal portion of the unsevered strip 8 threaded well into the cutter after the cutting operation. If desired, however, the cutter may be positioned upside down from the position shown in the drawing and the strip is then kept threaded by the roller 14 and the guides mounted on top of the cutter.

Rotation of the cylinder 57 to actuate the cutter is effected by a solenoid 62 having an axially movable armature 63 which is connected to the cylinder 57 by means of a toggle linkage comprising a pair of angularly disposed arms 64 and 65. The operation of the solenoid 62 to actuate the cutter 55 is synchronized with the web-feeding mechanism so that the cutter is actuated when a strip sufficiently long to permit the formation of a receipt copy thereon has been fed forwardly by the web-feeding mechanism as more fully described hereinafter.

The chain 18 which drives the web-feeding mechanism 7 and the storage reel 44 also rotates a sprocket 71 which is fixed to an axle 72 which is in turn journaled between cross members 51 and 52. Fixed to the axle 72 between the cross members is a rotary cam 73 which, once each revolution of the axle 72, moves outwardly a cam follower 74 affixed to the contact arm 75 of a micro-switch 76 mounted on the cross member 51. When the micro-switch 76 is actuated by the cam 73, the electrical power to the motor 22 and the lamp 6 is cut off. Thus, the lamp is de-energized and the feeding of the strips 8 and 9 is discontinued.

The actuation of the micro-switch 76 by the cam 73 further causes an electrical impulse to be sent to a timer 77 which, after a delay sufficiently long to enable the web-feeding mechanism and thus the strips 8 and 9 to come to a complete rest, causes an electrical impulse to be sent to the solenoid 62 to actuate the cutter 55. The timer thus compensates for any continued movement of the strip 8 after the motor is de-energized. If the cutter were actuated while such strip were still moving, slack would be formed which would tend to cause the end of the strip 8 to become unthreaded from the cutter.

The strips 8 and 9, before being fed past the lamp 6, are moved across the surface of a table 81 which is fixed to the housing frame. Rotatably mounted on the frame above the table 81 by means of an arm 82 is a stamping roller 83 to which ink is supplied by an inking roller 84. The stamp 83 is urged toward the table 81 by gravity. If desired, however, a suitable spring may be provided to urge the stamp downwardly. The stamp 83 imprints any desired indicia on the strips 8 and 9 such as the deposit date or a contractual agreement or the like. The stamp employs an ink which is reproducible by the copying device so that the stamping need be effected on the strip 9 only and will be reproduced on the strip 8 in the copying operation. If desired, the indicia may be imparted to both strips by a perforating rather than an inking operation.

In operation, a roll of two strips of copying paper 8 and 9 is mounted on the supply reel 31 and threaded beneath the stamp roller 83 and through the web-feeding device 7 around the roll 12, behind the roll 13 and again around the roll 20. The innermost strip 8 is threaded into the cutter 55 and the outermost strip 9 is passed over the lip 41 through the chute 42 and is attached to the storage reel 44. When the master switch is turned on, the apparatus is ready for automatic operation.

The insertion of a check into the inlet 15 rotates the contact arm 26 of the micro-switch 25, thus energizing the motor 22 and the copying lamp 6. The motor 22 rotates the roller 20 to move the transparent belt 10 and also rotates the storage reel 44 on which the end of strip 9 is wound. The check is caught in the nip between the strip 9 and the roller 13 and is passed with the strips 8 and 9 as a three-ply combination past the copying lamp 6, thereby reproducing the check markings on both the strips 8 and 9. The indicia placed on the strip 9 by the stamp 83 are also reproduced on the strip 8. When the check clears the roller 13, it is fed over the lip 41 into the chute 42 and descends downwardly into the safe 5. The strip 9 containing the storage copy is also fed over the lip 41 into the chute 42 and is wound upon the storage reel 44 for retention by the bank. The strip 8 containing the receipt copy is fed between the rollers 20 and 14 through the cutter 55 and into the entrance of chute 39.

The gear ratio of the axle 72 to the web-feeding mechanism is such that, after the motor is energized, it continues to operate until a point on the strips 8 and 9 which initially was ahead of the stamping roller 83 passes completely through the cutter 56, at which time the cam 73 on the axle 72 actuates the arm 75 of the micro-switch 76 to de-energize the motor 22 and the copying lamp 6 and to actuate the timer 77. After the forward motion of the copying paper has ceased following de-energization of the motor 22, the timer 77 causes actuation of the solenoid 62 which actuates the cutter 55 to sever the receipt copy from the strip 8. Thus, the receipt copy contains a reproduction of the check and the indicia imprinted by the stamp 83 on the strip 9. The receipt copy passes downwardly through the outlet chute 39 and may be removed through the outlet 40 by the depositor. The apparatus is then ready to receive another check.

There has been illustrated and described what is considered to be a preferred embodiment of the apparatus of the invention. It will be apparent, however, that many modifications may be made without departing from the invention, the scope of which is determined by the appended claims.

I claim:

1. An apparatus for storing and receipting for written sheets which comprises housing means having an inlet for written sheets, radiant energy copying means within said housing means for forming on each of a pair of strips of sheet material sensitive to such radiant energy identical images of the writing on each of said sheets while the sheet being copied is assembled in superposed relationship with said strips and is moving through said copying means, roll means carrying a pair of said radiant energy sensitive strips as continuous webs, means for feeding said sheets and strips in said assembled relationship through said copying means to form said images on portions of each said strips, means to disassemble said strips and sheets after said images are formed, cutter means to sever the image carrying portion from one of said strips, means in said housing means for storing said sheets and one of said pair of image carrying strips, outlet means to discharge the other of said pair of image carrying strips from said housing, and means to guide said strips and sheets after disassembly to their respective storage means and outlet means.

2. An apparatus as recited in claim 1 further comprising means responsive to the insertion of a written sheet into said inlet to actuate said copying and feeding means and to stop said feeding means after said images are formed, and means synchronized with said actuating means for operating said cutter means after said strips have stopped.

3. An apparatus as recited in claim 2 further comprising means to mark said web material with indicia to be carried by each receipt copy.

4. An apparatus as recited in claim 3 wherein said marking means places said indicia on only one of said strips prior to said copying and said copying means forms an image of said indicia on the other of said strips.

References Cited in the file of this patent

UNITED STATES PATENTS

| | | |
|---|---|---|
| 957,083 | Nauck | May 3, 1910 |
| 1,506,491 | Kline | Aug. 26, 1924 |
| 1,806,763 | McCarthy | May 26, 1931 |
| 1,954,318 | Hopkins | Apr. 10, 1934 |
| 2,492,005 | Pratt et al. | Dec. 20, 1949 |
| 2,509,072 | Pratt et al. | May 23, 1950 |
| 2,520,641 | Land | Aug. 29, 1950 |
| 2,565,088 | Pratt et al. | Aug. 21, 1951 |
| 2,604,967 | Murtaugh | July 29, 1952 |
| 2,627,203 | Hessert | Feb. 3, 1953 |
| 2,699,372 | Mosler | Jan. 11, 1955 |
| 2,740,895 | Miller | Apr. 3, 1956 |
| 2,831,979 | Kallenberg et al. | Apr. 22, 1958 |
| 2,891,165 | Kuhrmeyer et al. | June 16, 1959 |
| 2,923,587 | Zipf | Feb. 2, 1960 |
| 2,927,515 | Simjian | Mar. 8, 1960 |
| 2,936,684 | Simjian | May 17, 1960 |
| 2,960,377 | Simjian | Nov. 15, 1960 |

FOREIGN PATENTS

| | | |
|---|---|---|
| 605,678 | Germany | Nov. 16, 1934 |